United States Patent
Furushige et al.

(10) Patent No.: US 9,141,376 B2
(45) Date of Patent: Sep. 22, 2015

(54) NON-TRANSITORY COMPUTER-READABLE RECORDING MEDIUM HAVING A SOFTWARE UPDATE PROGRAM RECORDED THEREON THAT SELECTS A SOFTWARE UPDATE METHOD THAT REQUIRES A SHORTER TIME, AND SOFTWARE UPDATE APPARATUS

(71) Applicant: KYOCERA Document Solutions Inc., Osaka (JP)

(72) Inventors: Katsuji Furushige, Osaka (JP); Ayaka Ikejima, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 14/304,624

(22) Filed: Jun. 13, 2014

(65) Prior Publication Data

US 2014/0372997 A1    Dec. 18, 2014

(30) Foreign Application Priority Data

Jun. 14, 2013    (JP) .................................. 2013-126173

(51) Int. Cl.
G06F 9/44    (2006.01)

(52) U.S. Cl.
CPC .......................................... *G06F 8/68* (2013.01)

(58) Field of Classification Search
CPC .................................... G06F 8/65; G06F 8/68
USPC .................................................. 717/168–173
See application file for complete search history.

(56) References Cited

U.S. PATENT DOCUMENTS

| | | | | |
|---|---|---|---|---|
| 5,805,898 A | * | 9/1998 | Barsness et al. | 717/175 |
| 6,052,531 A | * | 4/2000 | Waldin et al. | 717/170 |
| 6,651,249 B2 | * | 11/2003 | Waldin et al. | 717/170 |
| 7,185,332 B1 | * | 2/2007 | Waldin et al. | 717/170 |
| 7,840,957 B2 | * | 11/2010 | Kumashiro et al. | 717/173 |

(Continued)

FOREIGN PATENT DOCUMENTS

| | | |
|---|---|---|
| JP | 2011-237861 | 11/2011 |
| JP | 2012-190199 | 10/2012 |

OTHER PUBLICATIONS

Potter et al., "Reducing downtime due to system maintenance and upgrades," 2005, USENIX Association, p. 1-4.*

*Primary Examiner* — Qing Chen
(74) *Attorney, Agent, or Firm* — Knobbe, Martens, Olson & Bear LLP

(57) ABSTRACT

A software update program recorded on a non-transitory computer-readable recording medium causes a computer to act as an update instruction unit that instructs an electronic apparatus to update software, and a method selection unit that selects a method that requires a shorter time, from normal updating in which the electronic apparatus receives renewed software and updates current software to the renewed software, and incremental updating in which the electronic apparatus receives difference data between the renewed software and the current software and applies the difference data to the current software for updating to the renewed software. The update instruction unit instructs the electronic apparatus to update the software by the normal update method when the method selection unit selects the normal update method, and instructs the electronic apparatus to update the software by the incremental update method when the method selection unit selects the incremental update method.

8 Claims, 11 Drawing Sheets

(56) References Cited

U.S. PATENT DOCUMENTS

| | | | |
|---|---|---|---|
| 2002/0016959 A1* | 2/2002 | Barton et al. | 717/178 |
| 2003/0177485 A1* | 9/2003 | Waldin et al. | 717/169 |
| 2007/0294684 A1* | 12/2007 | Kumashiro et al. | 717/168 |
| 2010/0083242 A1* | 4/2010 | Altstaedt et al. | 717/169 |
| 2010/0114853 A1* | 5/2010 | Fisher et al. | 707/705 |
| 2011/0276958 A1 | 11/2011 | Nishikawa | |
| 2012/0151463 A1* | 6/2012 | Kalogeropulos et al. | 717/160 |
| 2013/0245884 A1* | 9/2013 | Forutanpour et al. | 701/36 |

* cited by examiner

NON-TRANSITORY COMPUTER-READABLE RECORDING MEDIUM HAVING A SOFTWARE UPDATE PROGRAM RECORDED THEREON THAT SELECTS A SOFTWARE UPDATE METHOD THAT REQUIRES A SHORTER TIME, AND SOFTWARE UPDATE APPARATUS

INCORPORATION BY REFERENCE

This application claims priority to Japanese Patent Application No. 2013-126173 filed on Jun. 14, 2013, the entire contents of which are incorporated by reference herein.

BACKGROUND

The present disclosure relates to a computer-readable non-transitory recording medium having a program recorded thereon, the program being a software update program for instructing an electronic apparatus to update the software, and to a software update apparatus.

An incremental update method is generally known, in which an electronic apparatus receives difference data representing a difference of renewed software with respect to current software, and applies the difference data to the current software thus to update the current software to the renewed software. Normally, the incremental update method requires a shorter time compared with a normal update method in which the electronic apparatus receives the renewed software itself and updates the current software to the renewed software.

SUMMARY

In a computer-readable non-transitory recording medium having a software update program recorded thereon according to the disclosure, the software update program is configured to cause a computer to act as an update instruction unit and a method selection unit.

The update instruction unit instructs an electronic apparatus to update software.

The method selection unit selects a method that requires a shorter time, from a normal update method in which the electronic apparatus receives renewed software and updates current software to the renewed software, and an incremental update method in which the electronic apparatus receives difference data representing a difference of the renewed software with respect to the current software, and applies the difference data to the current software thus to update the current software to the renewed software.

The update instruction unit instructs the electronic apparatus to update the software by the normal update method when the method selection unit selects the normal update method, and instructs the electronic apparatus to update the software by the incremental update method when the method selection unit selects the incremental update method.

In another aspect, the disclosure provides a software update apparatus including an update instruction unit and a method selection unit.

The update instruction unit instructs an electronic apparatus to update software.

The method selection unit selects a method that requires a shorter time from a normal update method in which the electronic apparatus receives renewed software and updates current software to the renewed software, and an incremental update method in which the electronic apparatus receives difference data representing a difference of the renewed software with respect to the current software and applies the difference data to the current software thus to update the current software to the renewed software.

The update instruction unit instructs the electronic apparatus to update the software by the normal update method when the method selection unit selects the normal update method, and instructs the electronic apparatus to update the software by the incremental update method when the method selection unit selects the incremental update method.

DETAILED DESCRIPTION

Hereafter, an embodiment of the disclosure will be described with reference to the drawings.

First, a configuration of a firmware update system according to the disclosure will be described.

Figure 1:
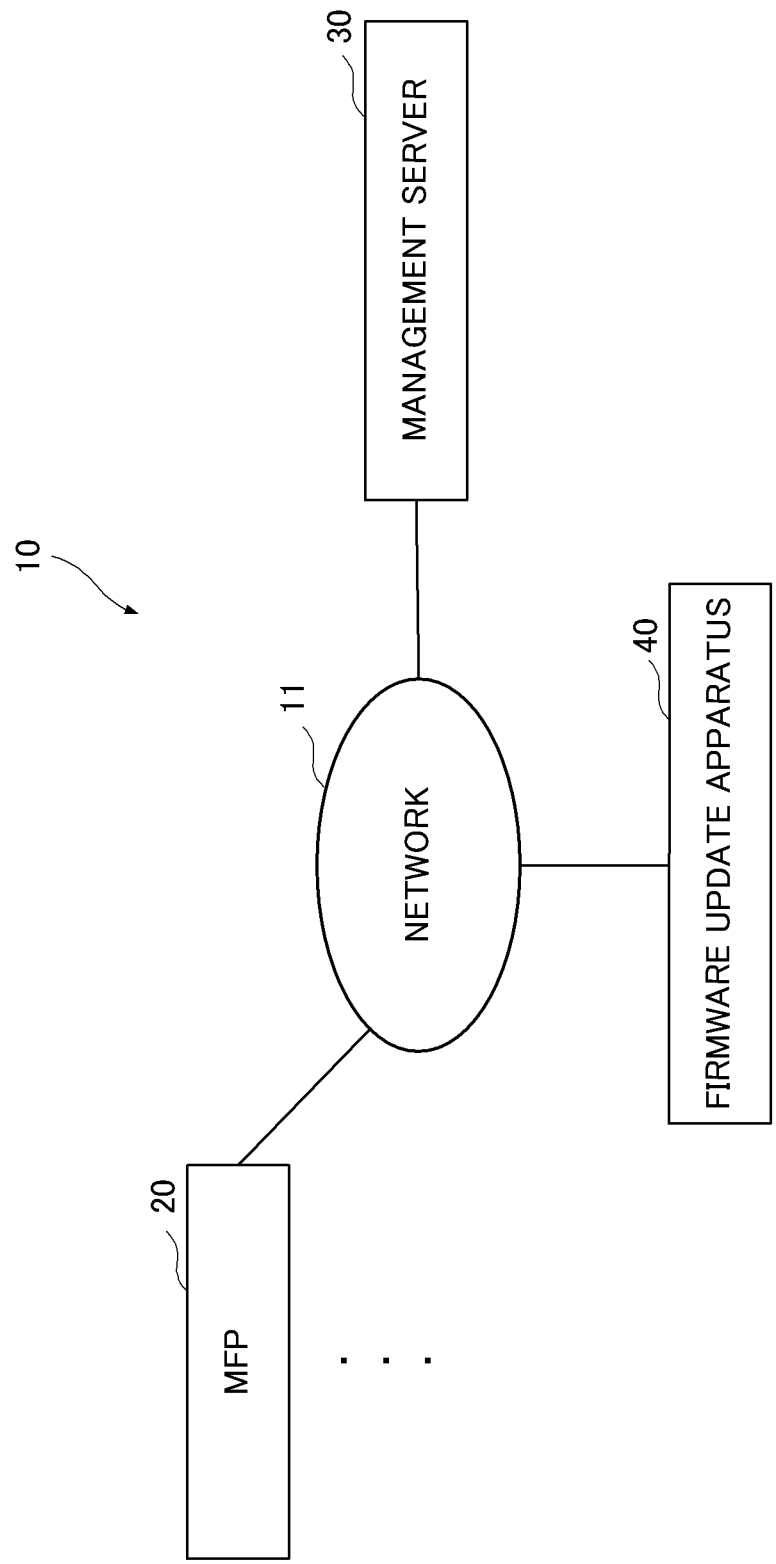
FIG. 1 shows a configuration of a firmware update system according to an embodiment of the disclosure.

FIG. 1 shows a configuration of the firmware update system 10 according to the embodiment of the disclosure.

As shown in FIG. 1, the firmware update system 10 includes a plurality of multifunction peripherals, one of which will hereinafter be referred to as MFP 20, a management server 30, and a firmware update apparatus 40. MFP (Multifunctional Peripheral) is a device having a plurality of functions such as a copying function, a printing function, a scanning function, and a facsimile function. The management server 30 controls the MFPs. The firmware update apparatus 40 is the software update apparatus that instructs the MFP to update software, for example firmware. The MFPs, the management server 30, and the firmware update apparatus 40 constituting the firmware update system 10 are communicably connected to each other via a network 11 such as a local area network (LAN) or the internet.

The MFPs in the firmware update system 10 are configured similarly to the MFP 20. Therefore, the MFP 20 will be focused on in the subsequent description of the firmware update system 10.

Figure 2:
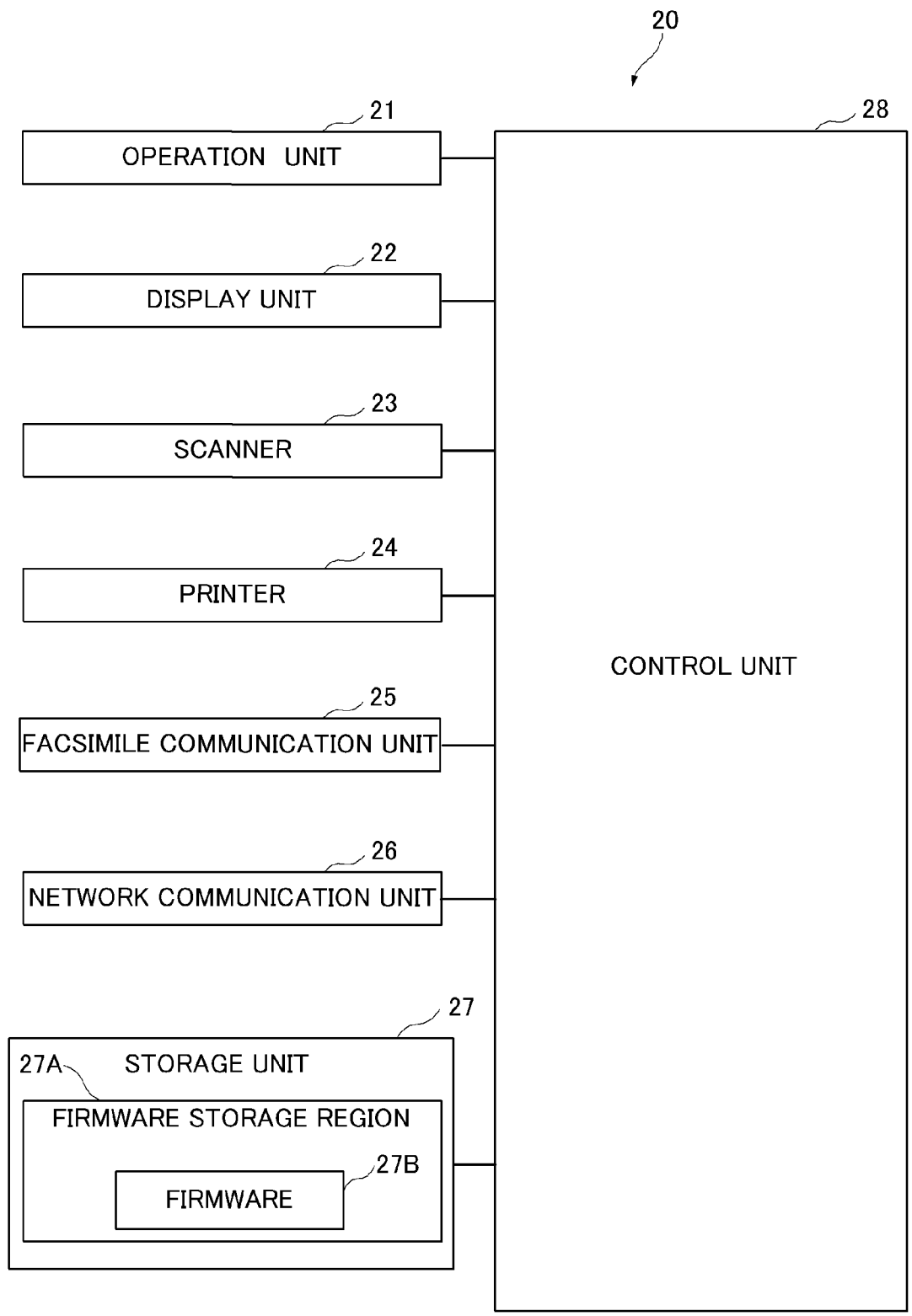
FIG. 2 shows a configuration of the MFP shown in FIG. 1.

FIG. 2 shows a configuration of the MFP 20.

As shown in FIG. 2, the MFP 20 includes an operation unit 21, a display unit 22, a scanner 23, a printer 24, a facsimile communication unit 25, a network communication unit 26, a storage unit 27, and a control unit 28. The operation unit 21 is an input device composed of buttons and so forth for various inputs by a user. The display unit 22 is a device such as a liquid crystal display (LCD) for displaying various kinds of information. The scanner 23 is a device for reading images from source documents. The printer 24 is a device for printing images on a recording medium such as a paper sheet. The facsimile communication unit 25 is a device for performing facsimile communication with non-illustrated external facsimile machines through a communication line such as a public circuit. The network communication unit 26 is a device for communication with external apparatuses through the network 11 (see FIG. 1). The storage unit 27 is a non-volatile memory in which various data is stored, such as an electrically erasable programmable read only memory (EEPROM) and a hard disk drive (HDD). The control unit 28 is a processor that controls the overall operation of the MFP 20. In the embodiment, the MFP 20 corresponds to the electronic apparatus referred to in the disclosure.

The operation unit 21 may include an input device constituted of a touch panel incorporated in the display unit 22.

The storage unit 27 includes a firmware memory region 27A where firmware 27B is stored.

The control unit 28 includes, for example, a central processing unit (CPU), a read only memory (ROM) containing programs and various data, and a random access memory (RAM) employed as the operation region of the CPU. The CPU executes the programs stored in the ROM or the storage unit 27.

The control unit 28 executes the firmware 27B stored in the firmware memory region 27A.

To update the firmware 27B, the control unit 28 supports a normal update method, in which, upon receipt of renewed software, for example renewed firmware through the network communication unit 26, the control unit 28 rewrites the current software, for example the current firmware, to the renewed firmware. The control unit 28 also supports an incremental update method, in which, upon receipt of a patch composed of difference data representing a difference of the renewed software with respect to the current firmware through the network communication unit 26, the control unit 28 applies the patch to the current firmware, thus to update the current firmware to the renewed firmware.

Figure 3:
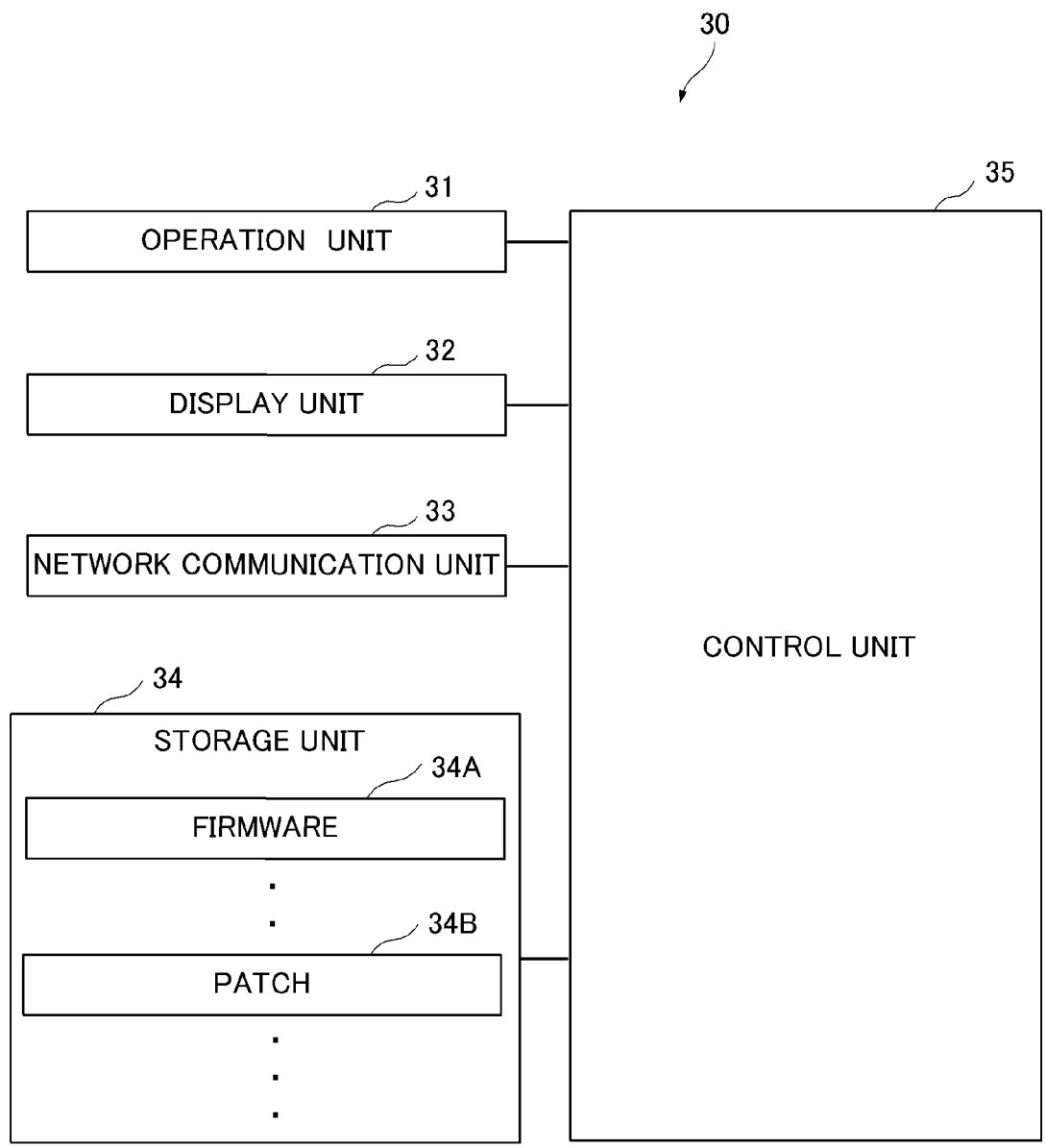
FIG. 3 shows a configuration of the management server shown in FIG. 1.

FIG. 3 shows a configuration of the management server 30.

As shown in FIG. 3, the management server 30 includes an operation unit 31, a display unit 32, a network communication unit 33, a storage unit 34, and a control unit 35. The operation unit is an input device composed of a mouse, a keyboard, and so forth for making various inputs. The display unit 32 is a device such as an LCD for displaying various kinds of information. The network communication unit 33 is a device for communication with external apparatuses through the network 11 (see FIG. 1). The storage unit 34 is a non-volatile memory in which various data is stored, such as an HDD. The control unit 35 is a processor that controls the overall operation of the management server 30. The management server 30 is constituted of a computer such as a personal computer (PC).

The storage unit 34 is capable of storing therein each of different versions of the firmware 34A for the MFPs.

The storage unit 34 can also store the patch 34B based on two different versions of the firmware 34A, with respect to each of the combinations of two versions.

The control unit 35 includes, for example, a CPU, a ROM containing programs and various data, and a RAM employed as the operation region of the CPU. The CPU executes the programs stored in the ROM or the storage unit 34.

Figure 4:
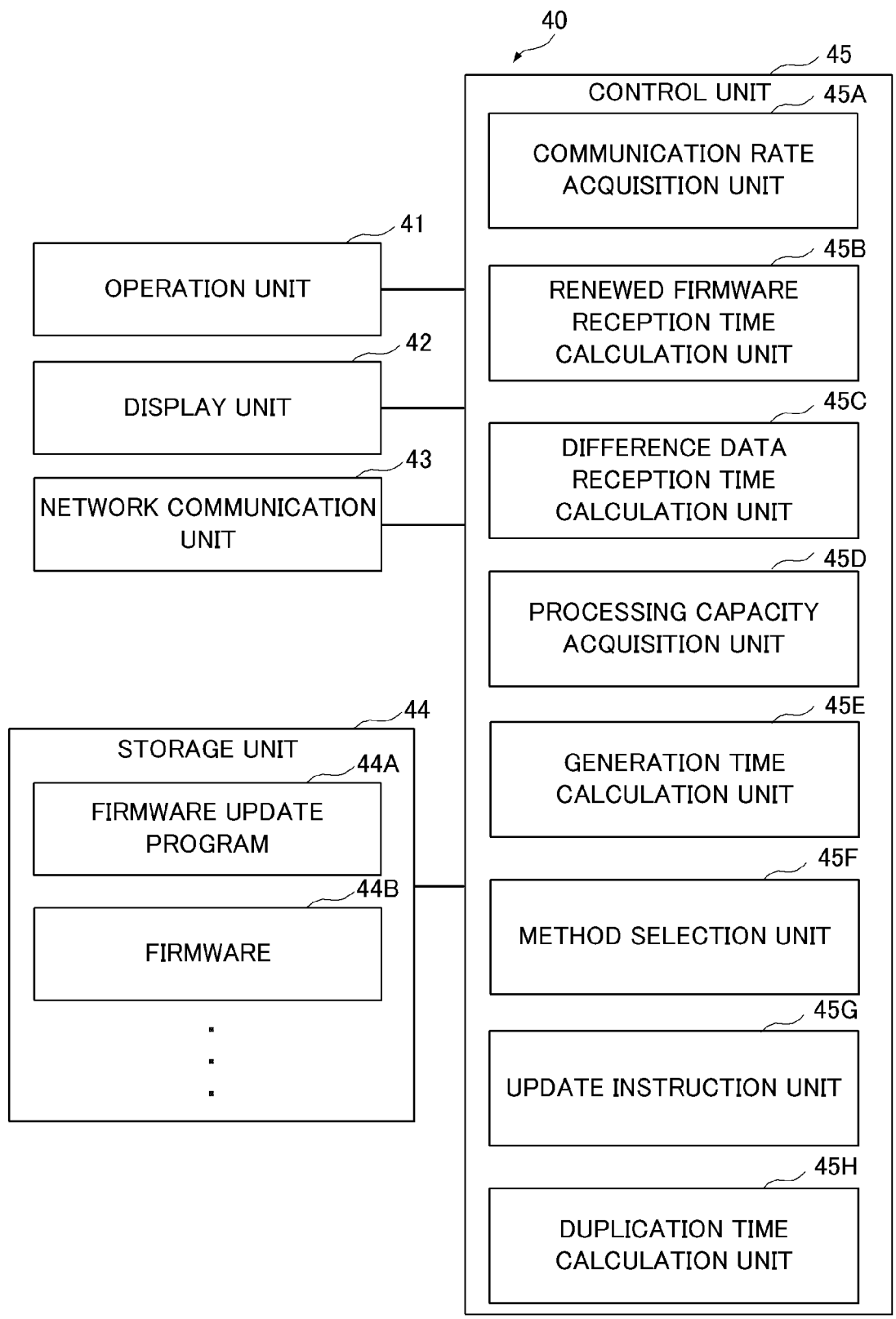
FIG. 4 shows a configuration of the firmware update apparatus shown in FIG. 1.

FIG. 4 shows a configuration of the firmware update apparatus 40.

As shown in FIG. 4, the firmware update apparatus 40 includes an operation unit 41, a display unit 42, a network communication unit 43, a storage unit 44, and a control unit 45. The operation unit is an input device composed of a mouse, a keyboard, and so forth for making various inputs. The display unit 42 is a device such as an LCD for displaying various kinds of information. The network communication unit 43 is a device for communication with external apparatuses through the network 11 (see FIG. 1). The storage unit 44 is a non-volatile memory in which various data is stored, such as an HDD. The control unit 45 is a processor that controls the overall operation of the firmware update apparatus 40. The firmware update apparatus 40 is constituted of a computer such as a PC.

The storage unit 44 stores therein a firmware update program 44A, corresponding to the software update program in the disclosure, for instructing the MFP 20 to update the firmware. The firmware update program 44A may be preinstalled in the firmware update apparatus 40 in the manufacturing process thereof. The firmware update program 44A may also be additionally installed in the firmware update apparatus 40 from a recording medium such as a compact disk (CD) or a digital versatile disk (DVD). The firmware update program 44A may also be additionally installed in the firmware update apparatus 40 through the network 11.

The storage unit 44 is capable of storing therein each of different versions of the firmware 44B for the MFPs.

The control unit 45 includes, for example, a CPU, a ROM containing programs and various data, and a RAM employed as the operation region of the CPU. The CPU executes the programs stored in the ROM or the storage unit 44.

The control unit 45 is configured to act, by executing the firmware update program 44A stored in the storage unit 45, as a communication rate acquisition unit 45A, a renewed firmware reception time calculation unit 45B, a difference data reception time calculation unit 45C, a processing capacity acquisition unit 45D, a generation time calculation unit 45E, a method selection unit 45F, an update instruction unit 45G and a duplication time calculation unit 45H. The communication rate acquisition unit 45A acquires a communication rate of the MFP 20 (more specifically, communication rate between the MFP 20 and the management server 30). The renewed firmware reception time calculation unit 45B is the renewed software reception time calculation unit in the disclosure that calculates a communication time necessary for the MFP 20 to receive renewed firmware. The difference data reception time calculation unit 45C calculates a communication time necessary for the MFP 20 to receive a patch. The processing capacity acquisition unit 45D acquires the processing capacity of the MFP 20. The generation time calculation unit 45E calculates a generation time necessary for the MFP 20 to apply the patch to current firmware thereby generating renewed firmware. The method selection unit 45F selects the one that requires a shorter time from the normal update method and the incremental update method. The update instruction unit 45G instructs the MFP 20 to update firmware. The duplication time calculation unit 45H calculates a duplication time necessary for the MFP 20 to duplicate current firmware.

Hereunder, an operation of the firmware update system 10 will be described.

First, description will be given on the operation performed by the firmware update system 10 when firmware of the latest version for the MFP 20 is uploaded by the firmware update apparatus 40 to the management server 30.

The control unit 45 of the firmware update apparatus 40 transmits, when the firmware 44B of the latest version is stored in the storage unit 44, that firmware to the management server 30 through the network communication unit 43.

Figure 5:
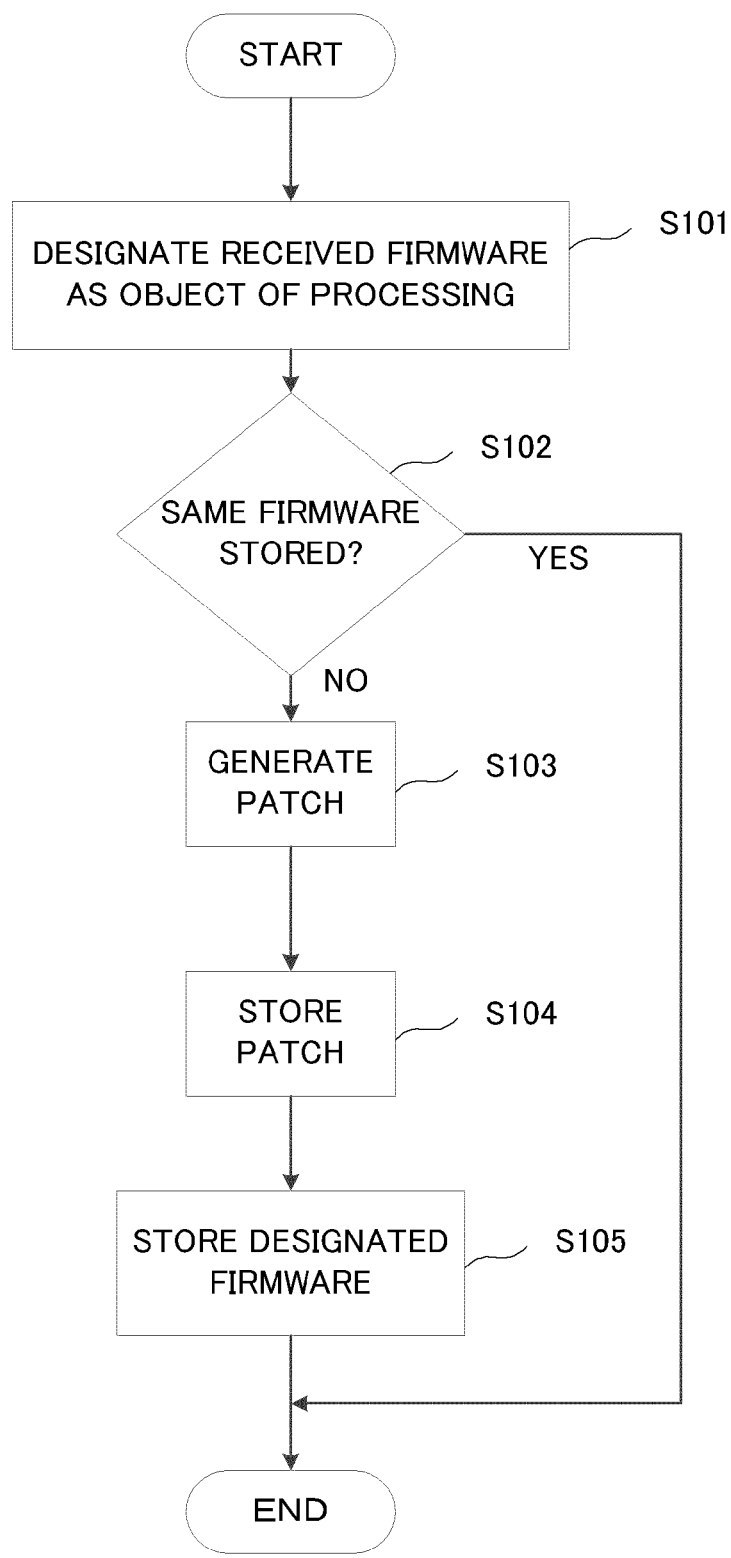
FIG. 5 shows an operation performed by the management server shown in FIG. 3 when firmware of a latest version for the MFP is uploaded.

The control unit 35 of the management server 30 performs the operation shown in FIG. 5, upon receipt of the firmware transmitted from the firmware update apparatus 40 through the network communication unit 33.

FIG. 5 shows the operation performed by the management server 30 when the firmware of the latest version for the MFP is uploaded.

As shown in FIG. 5, the control unit 35 of the management server 30 designates the firmware received through the network communication unit 33 as object of processing (S101).

Then the control unit 35 determines whether the firmware 34A of the same version as that of the firmware designated at S101 is stored in the storage unit 34 (S102). At S102, the control unit 35 confirms the version of the firmware 34A stored in the storage unit 34, and determines that the firmware 34A of the same version as that of the firmware designated at S101 is not stored in the storage unit 34, in the case where the version of the firmware designated at S101 is different from all the versions of the firmware 34A stored in the storage unit 34.

Upon determining at S102 that the firmware 34A of the same version is not stored in the storage unit 34, the control unit 35 generates, with respect to each of all the firmware 34A stored in the storage unit 34, a patch composed of difference data representing a difference of the firmware of the later version between the firmware 34A and the firmware designated at S101, with respect to the firmware of the earlier version (S103).

The control unit 35 then stores the patch generated at S103 in the storage unit 34, as the patch 34B (S104). Accordingly, the storage unit 34 stores the patch 34B with respect to each of the combinations of each version of all of the firmware 34A stored in the storage unit 34 and the version of the firmware designated at S101.

Upon completing the step of S104, the control unit 35 stores the firmware designated at S101 in the storage unit 34, as the firmware 34A (S105).

The control unit 35 finishes the operation shown in FIG. 5, upon determining at S102 that the firmware 34A of the same version is stored in the storage unit 34, or upon completing the step of S105.

Hereunder, the operation performed by the firmware update apparatus 40 to instruct the MFP 20 to update the firmware will be described The control unit 45 of the firmware update apparatus 40 performs the operation shown in FIG. 6, when an instruction to update the firmware to a latest version is inputted to the MFP 20 through the operation unit 41.

Figure 6:
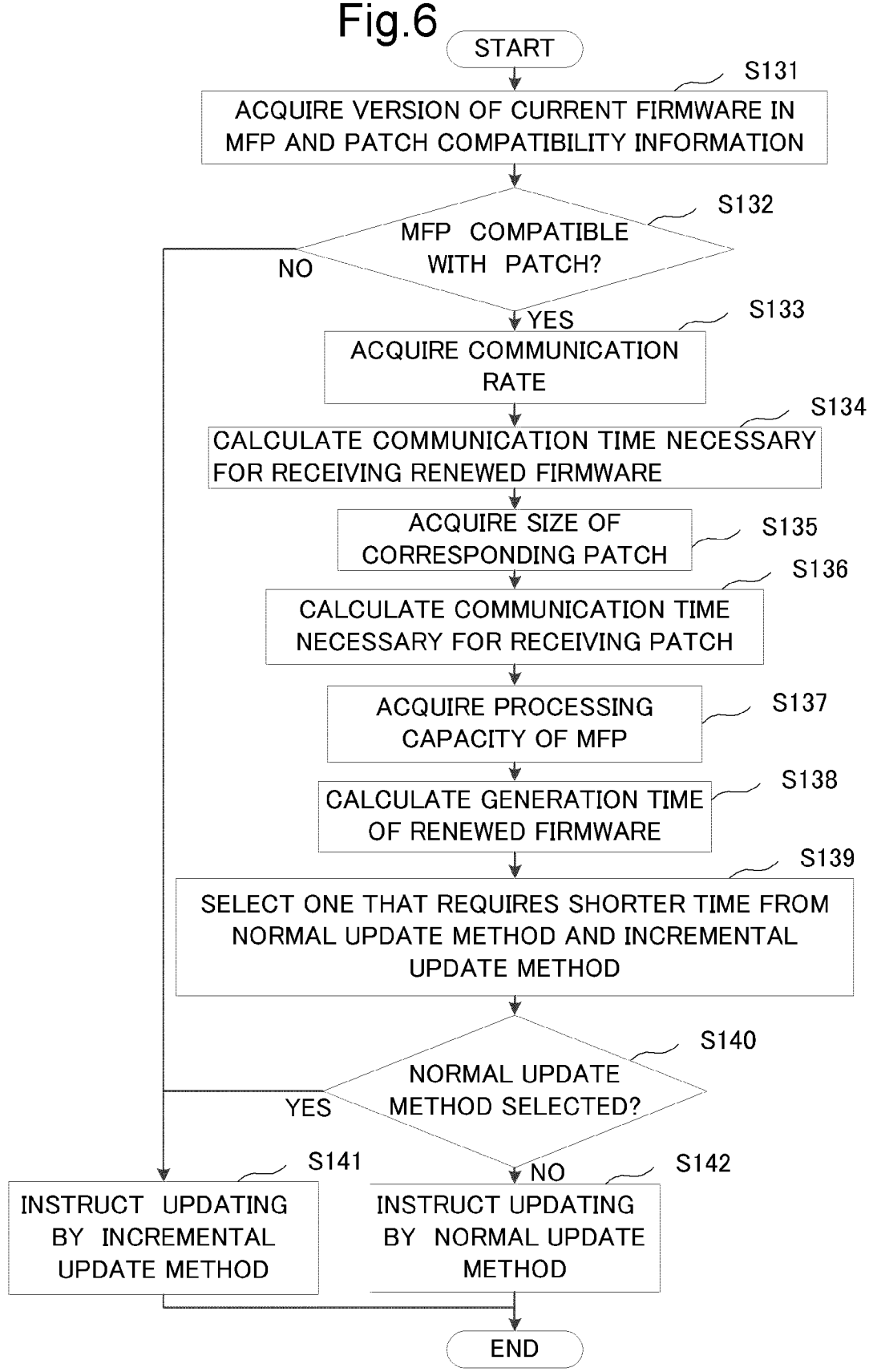
FIG. 6 shows an operation performed by the firmware update apparatus shown in FIG. 4 to instruct the MFP to update the firmware.

FIG. 6 shows the operation performed by the firmware update apparatus 40 to instruct the MFP 20 to update the firmware;

As shown in FIG. 6, the update instruction unit 45G of the control unit 45 acquires the version of the current firmware of the MFP 20, i.e., the firmware 27B stored in the firmware memory region 27A, and information about whether the MFP 20 is configured to accept a patch (hereinafter, patch compatibility information), from the MFP 20 through the network communication unit 43 (S131).

Then the update instruction unit 45G determines whether the MFP 20 is compatible with a patch, based on the patch compatibility information acquired at S131 (S132).

In the case where the MFP 20 is determined to be compatible with a patch at S132, the communication rate acquisition unit 45A acquires the communication rate of the MFP 20 (S133). At S133, the communication rate acquisition unit 45A may acquire a default communication rate stored in the storage unit 44 as the communication rate of the MFP 20. The communication rate acquisition unit 45A may also cause, for example, the management server 30 to transmit data of a specific size to the MFP 20 and calculate the communication rate of the MFP 20 from the time actually spent for receiving the data, to thereby acquire the communication rate of the MFP 20.

Following S133, the renewed firmware reception time calculation unit 45B calculates the communication time necessary for the MFP 20 to receive the renewed firmware, based on the communication rate acquired at S133 and the size of the renewed firmware, i.e., the firmware of the latest version (S134). Here, the renewed firmware reception time calculation unit 45B can acquire the size of the firmware of the latest version based on the firmware 44B in the storage unit 44.

Following S134, the difference data reception time calculation unit 45C acquires the size of the patch of the renewed firmware, i.e., the firmware of the latest version with respect to the current firmware, i.e., the firmware of the version acquired at S131, from the management server 30 through the network communication unit 43 (S135). In the case where the control unit 45 acquires in advance, from the management server 30 through the network communication unit 43, the sizes of all the patches stored in the management server 30 and stores the sizes in the storage unit 44, the difference data reception time calculation unit 45C may acquire the size of the patch being the difference data of the renewed firmware with respect to the current firmware, from the storage unit 44.

Following S135, the difference data reception time calculation unit 45C calculates the communication time necessary for the MFP 20 to receive the patch, based on the communication rate acquired at S133 and the size of the patch acquired at S135 (S136).

Then the processing capacity acquisition unit 45D acquires the processing capacity of the MFP 20 (S137). In the case where, for example, the processing capacity of the MFP 20 is stored in the storage unit 44, the processing capacity acquisition unit 45D acquires the processing capacity of the MFP 20 stored in the storage unit 44.

The generation time calculation unit 45E calculates, based on the processing capacity acquired at S137 and the size of the patch acquired at S135, the generation time necessary for the MFP 20 to apply the patch to the current firmware, i.e., the firmware of the version acquired at S131 thereby generating the renewed firmware, i.e., the firmware of the latest version (S138).

Then the method selection unit 45F selects the one that requires a shorter time from the normal update method and the incremental update method, based on the communication time calculated at S134, the communication time calculated at S136, and the generation time calculated at S138 (S139).

Figure 7:
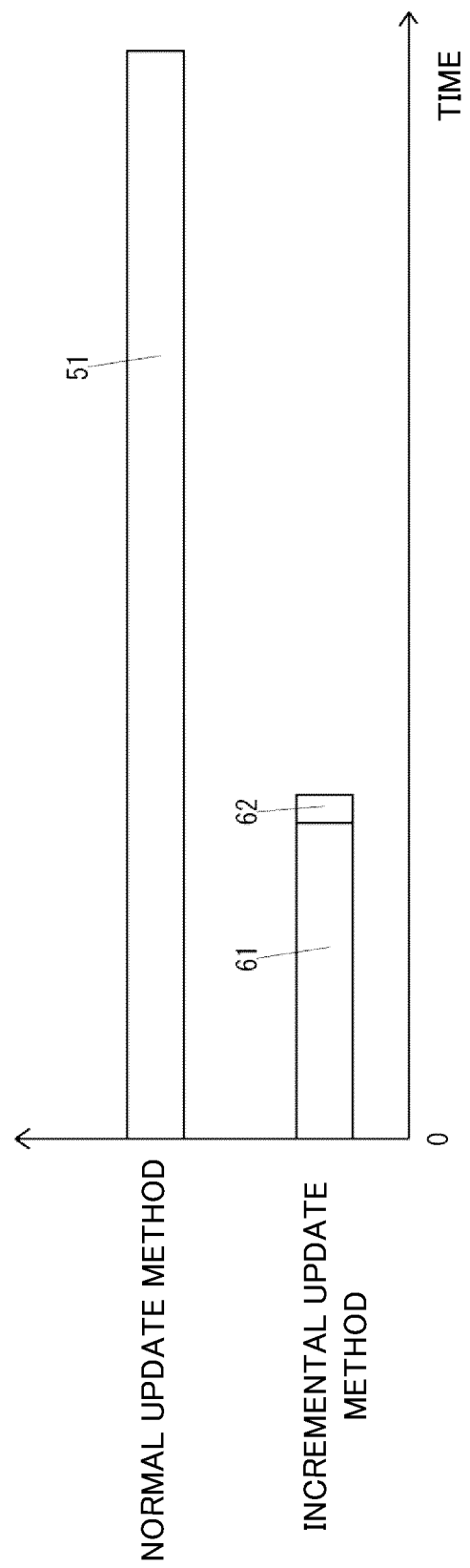
FIG. 7 shows a difference in time required, between a normal update method and an incremental update method in the MFP shown in FIG. 2.

FIG. 7 shows a difference in time required, between the normal update method and the incremental update method in the MFP 20.

As shown in FIG. 7, the normal update method requires a communication time 51 necessary for the MFP 20 to receive the renewed firmware. On the other hand, the incremental update method requires the communication time 61 necessary for the MFP 20 to receive the patch and the generation time 62 necessary for the MFP 20 to apply the patch to the current firmware thus to generate the renewed firmware, although the communication time 51 for the MFP 20 to receive the renewed firmware is not required. The time required for the normal update method includes the communication time 51 and an updating time necessary for updating the current firmware to the renewed firmware. The time required for the incremental update method includes the communication time 61, the generation time 62, and the updating time necessary for updating the current firmware to the renewed firmware.

Here, since the renewed firmware is larger in size than the patch, the communication time 51 is longer than the communication time 61. In the example shown in FIG. 7, the difference between the communication time 51 and the communication time 61 is longer than the generation time 62. The difference between the communication time 51 and the communication time 61 becomes shorter as the communication rate becomes higher, and at a certain point the difference may become shorter than the generation time 62. In addition, the generation time 62 becomes longer, the larger the size of the patch is or the smaller the processing capacity of the MFP 20 is, and hence the difference between the communication time 51 and the communication time 61 may become shorter than the generation time 62 at a certain point. The updating time makes no difference between the normal update method and the incremental update method, and therefore it may be determined that, in the aforementioned case, the time required for the series of operations in which the MFP 20 receives the data necessary for updating the firmware and updates the firmware becomes shorter by selecting the normal update method. Accordingly, in the case where a high-speed communication environment is available, a difference in size between the renewed firmware and the patch is not significant, or the processing capacity of the MFP 20 is small, the normal update method is more likely to be selected, than in the contrary case.

The method selection unit 45F determines that the normal update method requires the shorter time in the case where the communication time 51 calculated at S134 is shorter than the total time of the communication time 61 calculated at S136 and the generation time 62 calculated at S138, and selects the normal update method. In contrast, in the case where the communication time 51 calculated at S134 is longer than the total time of the communication time 61 calculated at S136 and the generation time 62 calculated at S138, method selection unit 45F determines that the incremental update method requires the shorter time, and selects the incremental update method. In the case where the communication time 51 calculated at S134 is the same as the total time of the communication time 61 calculated at S136 and the generation time 62 calculated at S138, whether the method selection unit 45F selects the normal update method or the incremental update method makes no difference. In such a case, the method selection unit 45F selects the one designated in advance.

Referring again to FIG. 6, following S139 the update instruction unit 45G determines whether the normal update method has been selected at S139 (S140).

The update instruction unit 45G instructs, through the network communication unit 43, the MFP 20 to update the firmware by the normal update method, in the case where the MFP 20 is determined to be incompatible with the patch at S132 or the normal update method is determined to have been selected at S140 (S141). Here, the update instruction unit 45G adds the version information of the firmware of the latest version to the instruction made at S141.

In the case where the update instruction unit 45G determines at S140 that the normal update method has not been selected, the update instruction unit 45G instructs, through the network communication unit 43, the MFP 20 to update the firmware by the incremental update method (S142). Here, the update instruction unit 45G adds the version information of the firmware of the latest version to the instruction made at S142.

Upon completing the step of either S141 or S142, the update instruction unit 45G finishes the operation shown in FIG. 6.

Now, the operation performed by the MFP 20 to update the firmware by the normal update method will be described hereunder.

Figure 8:
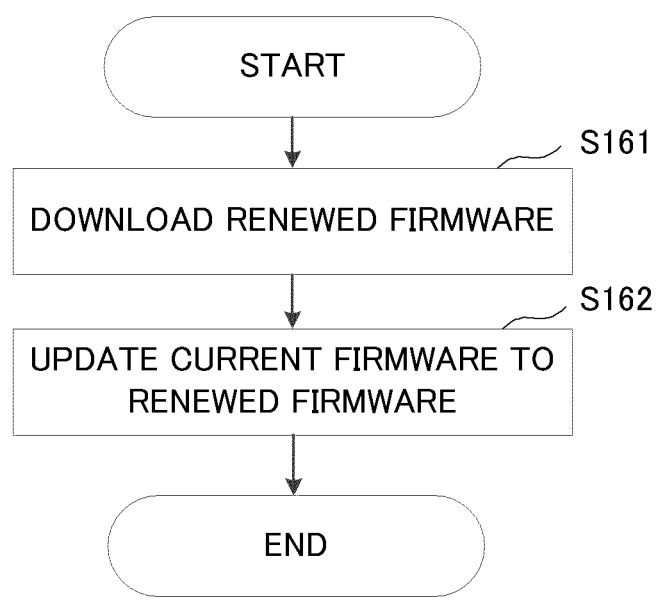
FIG. 8 shows an operation performed by the MFP shown in FIG. 2 to update the firmware by the normal update method.

The control unit 28 of the MFP 20 performs the operation shown in FIG. 8, upon receipt of the instruction to update the firmware by the normal update method from the firmware update apparatus 40 through the network communication unit 26.

FIG. 8 shows the operation performed by the MFP 20 to update the firmware by the normal update method.

As shown in FIG. 8, the control unit 28 downloads the firmware of the version included in the instruction received from the firmware update apparatus 40 as the renewed firmware, from the management server 30 through the network communication unit 26 (S161).

Then the control unit 28 updates the current firmware, i.e., the firmware 27B stored in the firmware memory region 27A to the renewed firmware downloaded at S161 (S162), and finishes the operation shown in FIG. 8.

Now, the operation performed by the MFP 20 to update the firmware by the incremental update method will be described hereunder.

Figure 9:
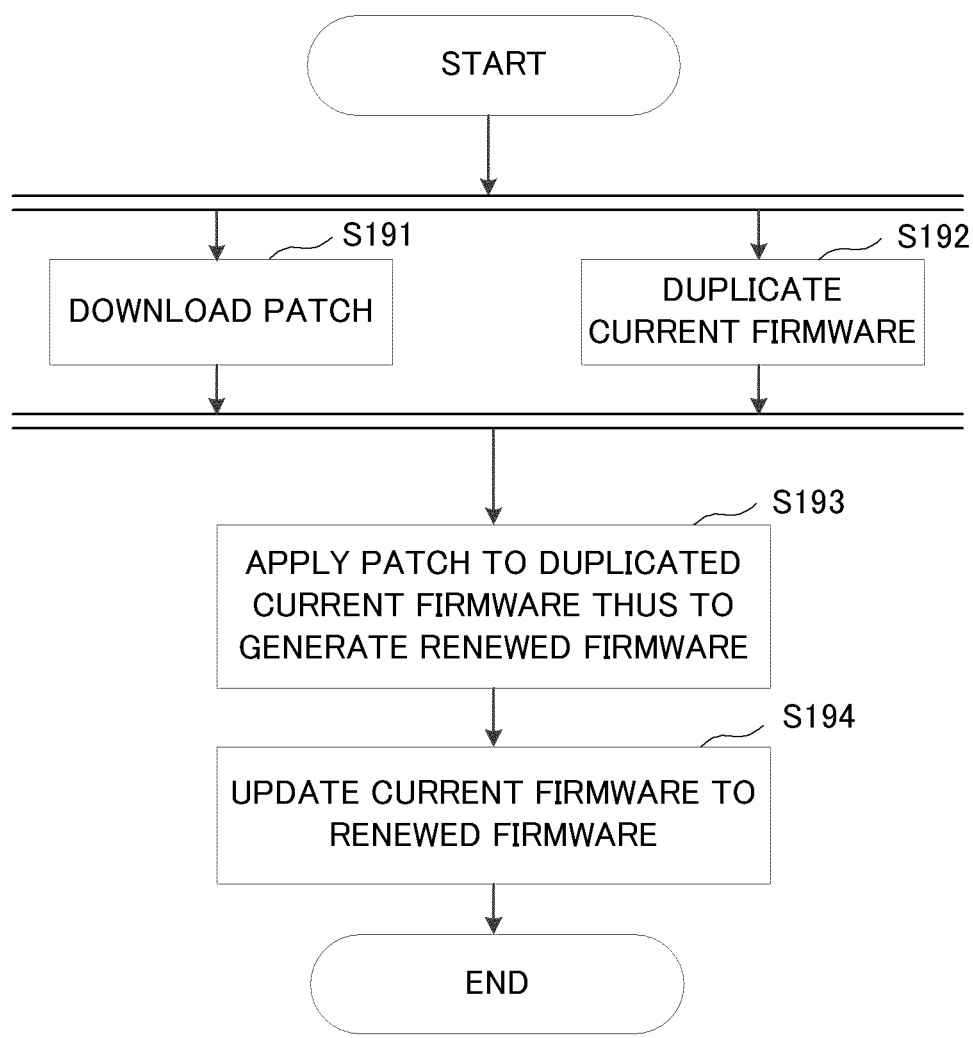
FIG. 9 shows an operation performed by the MFP shown in FIG. 2 to update the firmware by the incremental update method.

The control unit 28 of the MFP 20 performs the operation shown in FIG. 9, upon receipt of the instruction to update the firmware by the incremental update method from the firmware update apparatus 40 through the network communication unit 26.

FIG. 9 shows the operation performed by the MFP 20 to update the firmware by the incremental update method.

As shown in FIG. 9, the control unit 28 downloads a patch corresponding to the combination of the version included in the instruction received from the firmware update apparatus 40 and the version of the current firmware, i.e., the firmware 27B stored in the firmware memory region 27A, from the management server 30 through the network communication unit 26 (S191).

The control unit 28 also duplicates, in parallel to the operation of S191, the current firmware, i.e., the firmware 27B stored in the firmware memory region 27A and stores the copy of the firmware 27B in a region outside of the firmware memory region 27A (S192).

Following S191 and S192, the control unit 28 applies the patch downloaded at S191 to the current firmware stored in the region outside of the firmware memory region 27A at S192, to thereby generate the renewed firmware in the region outside of the firmware memory region 27A (S193).

Then the control unit 28 updates the current firmware, i.e., the firmware 27B stored in the firmware memory region 27A to the renewed firmware generated at S193 (S194), and finishes the operation shown in FIG. 9.

As described above, the firmware update apparatus 40 instructs the MFP 20 to update the firmware by the method that requires the shorter time between the normal update method and the incremental update method (S139 to S142). Such an arrangement enables reduction of the time required for the series of operations in which the MFP 20 receives the data necessary for updating the firmware and updates the firmware.

In addition, the firmware update apparatus 40 selects the method that requires the shorter time between the normal update method and the incremental update method taking into account the communication time for receiving the renewed firmware and the communication time for receiving the patch (S134, S136, and S139). The mentioned arrangement more effectively reduces the time required for the series of operations in which the MFP 20 receives the data necessary for updating the firmware and updates the firmware, compared with the case where the communication time is not taken into account.

Here, the communication rate may vary depending on the line condition between the MFP 20 and the management server 30, and hence the communication rate may vary in different districts. However, since the firmware update apparatus 40 calculates the communication time based on the communication rate of the MFP 20, the time required for the series of operations in which the MFP 20 receives the data necessary for updating the firmware and updates the firmware can be effectively reduced, irrespective of the district where the MFP 20 is installed.

In the case where the firmware update apparatus 40 calculates the communication time from an actually measured communication rate, the time required for the series of operations in which the MFP 20 receives the data necessary for updating the firmware and updates the firmware can be more effectively reduced, compared with the case where the communication time is calculated from a default communication rate.

Further, the firmware update apparatus 40 calculates the generation time necessary for the MFP 20 to apply the patch to the current firmware thus to generate the renewed firmware (S138), and selects the method that requires the shorter time between the normal update method and the incremental update method taking into account the generation time (S139). The mentioned arrangement more effectively reduces the time required for the series of operations in which the MFP 20 receives the data necessary for updating the firmware and updates the firmware, compared with the case where generation time is not taken into account.

In the embodiment, the firmware update apparatus 40 selects the method that requires the shorter time between the normal update method and the incremental update method, based on the communication time 51 necessary for the MFP 20 to receive the renewed firmware, the communication time 61 necessary for the MFP 20 to receive the patch, and the generation time 62 necessary for the MFP 20 to apply the patch to the current firmware thus to generate the renewed firmware. The mentioned arrangement allows proper selection of the normal update method or the incremental update method based on the actual time required, and thereby enables the time required for the series of operations, in which the MFP 20 receives the data necessary for updating the firmware and updates the firmware, to be effectively reduced.

Further, the firmware update apparatus 40 may also select the method that requires the shorter time between the normal update method and the incremental update method taking into account, in addition to the foregoing time, a time that may be involved in making a difference between the normal update method and the incremental update method, in the case where such a time is spent by the MFP 20.

Figure 10:
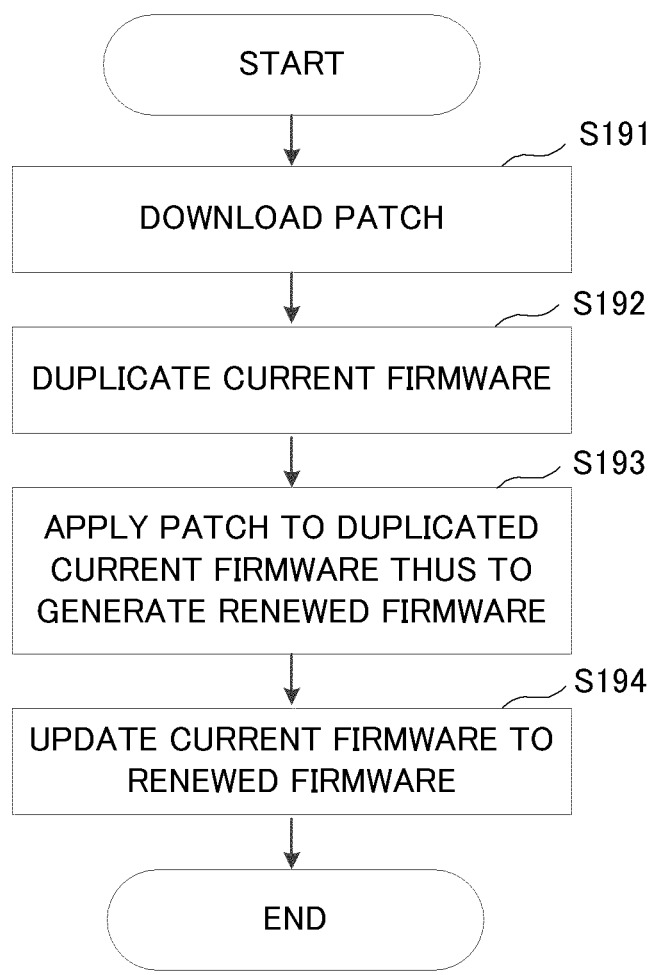
FIG. 10 shows another operation performed by the MFP shown in FIG. 2 to update the firmware by the incremental update method.
Figure 11:
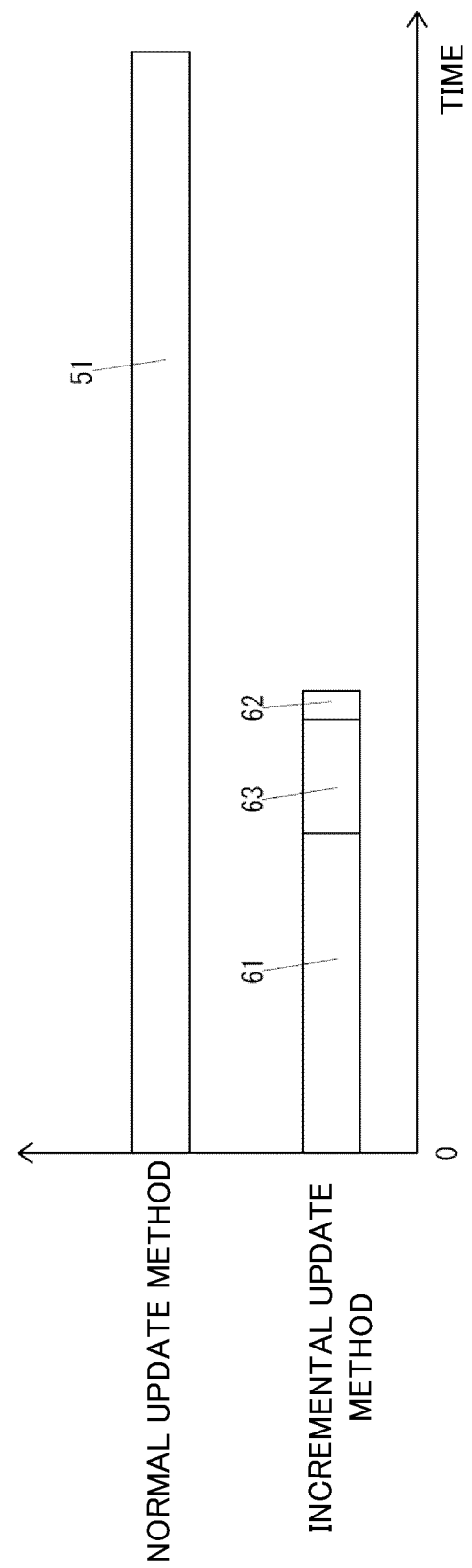
FIG. 11 shows a difference in time required between the normal update method and the incremental update method in the MFP shown in FIG. 2.

For example, the difference in time required in the MFP 20 between the normal update method and the incremental update method is expressed as FIG. 7, in the case where the MFP 20 downloads the patch (S191) and duplicates the current firmware (S192) in parallel as shown in FIG. 9 when updating the firmware by the incremental update method. In contrast, the difference in time required is expressed as FIG. 11, in the case where the MFP 20 sequentially downloads the patch (S191) and duplicates the current firmware (S192), instead of in parallel as shown in FIG. 10 when updating the firmware by the incremental update method. As shown in FIG. 11, the normal update method requires the communication time 51 necessary for the MFP 20 to receive the renewed firmware. The incremental update method requires, in contrast, the communication time 61 necessary for the MFP 20 to receive the patch, the generation time 62 necessary for the MFP 20 to apply the patch to the current firmware thus to generate the renewed firmware, and the duplication time 63 necessary for the MFP 20 to reproduce the current firmware in the region outside of the firmware memory region, instead of the communication time 51 necessary for the MFP 20 to receive the renewed firmware. The time required by the normal update method includes the communication time 51, and the updating time necessary for updating the current firmware to the renewed firmware. In contrast, the time required by the incremental update method includes the communication time 61, the generation time 62, the duplication time 63, and the updating time necessary for updating the current firmware to the renewed firmware.

Now, since the renewed firmware is larger in size than the patch, the communication time 51 is longer than the communication time 61. In the example shown in FIG. 11, the difference between the communication time 51 and the communication time 61 is longer than the total time of the duplication time 63 and the generation time 62. The difference between the communication time 51 and the communication time 61 becomes shorter as the communication rate becomes higher, and at a certain point the difference may become shorter than the generation time 62. In addition, the generation time 62 and the duplication time 63 become longer, the larger the size of the patch is or the smaller the processing capacity of the MFP 20 is, and at a certain point the difference between the communication time 51 and the communication time 61 may become shorter than the total time of the generation time 62 and the duplication time 63. The updating time makes no difference between the normal update method and the incremental update method, and therefore it may be determined that, in the aforementioned case, the time required for the series of operations in which the MFP 20 receives the data necessary for updating the firmware and updates the firmware becomes shorter by selecting the normal update method. Accordingly, in the case where a high-speed communication environment is available, a difference in size between the renewed firmware and the patch is not significant, or the processing capacity of the MFP 20 is small, the normal update method is more likely to be selected, than in the contrary case.

In the case where the downloading of the patch and the duplication of the current firmware are not performed in parallel, the firmware update apparatus 40 can select the method that requires the shorter time from the normal update method and the incremental update method based on the communication time 51, the communication time 61, the generation time 62, and the duplication time 63. More specifically, the method selection unit 45F determines that the normal update method requires the shorter time in the case where the communication time 51 is shorter than the total time of the communication time 61, the generation time 62, and the duplication time 63, and selects the normal update method. In contrast, the method selection unit 45F determines that the incremental update method requires the shorter time in the case where the communication time 51 is longer than the total time of the communication time 61, the generation time 62, and the duplication time 63, and selects the incremental update method.

Alternatively, the method selection unit 45F may be configured to acquire data indicating whether the MFP 20 duplicates the current firmware and receives the difference data in parallel. In this case, for example, the method selection unit 45F may cause the network communication unit 43 to transmit, to the MFP 20 in which the firmware is to be updated, an instruction to transmit the data indicating whether the duplication of the current firmware and reception of the difference data are to be performed in parallel. The method selection unit 45F thus receives the data indicating whether the duplication of the current firmware and reception of the difference data are to be performed in parallel from the MFP 20 in which the firmware is to be updated, and determines, in the case where the received data indicates that the MFP 20 duplicates the current firmware and receives the difference data in parallel, that the total time of the difference data reception time necessary for the MFP 20 to receive the difference data and the generation time necessary for the MFP 20 to apply the difference data to the current firmware thus to generate the renewed firmware constitutes the time required by the incremental update method, and selects either of the firmware update methods. In contrast, in the case where the received data does not indicate that the MFP 20 duplicates the current firmware and receives the difference data in parallel, the method selection unit 45F determines that the total time of the difference data reception time necessary for the MFP 20 to receive the difference data, the duplication time necessary for the MFP 20 to duplicate the current firmware, and the generation time necessary for the MFP 20 to apply the difference data to the current firmware thus to generate the renewed firmware constitutes the time required by the incremental update method, and selects either of the firmware update methods.

Further, the data indicating whether the duplication of the current firmware and reception of the difference data are to be performed in parallel may be stored in the storage unit 44, with respect to each of the MFPs having the firmware to be updated. In this case, the method selection unit 45F acquires the data indicating whether the duplication of the current firmware and reception of the difference data are to be performed in parallel, from the storage unit 44.

Further, the duplication time calculation unit 45H may calculate, in the process shown in FIG. 6, the duplication time 63 necessary for the MFP 20 to duplicate the current firmware at S138, based on the processing capacity acquired at S137 and the size of the current firmware.

The firmware update apparatus 40 selects the method that requires the shorter time from the normal update method and the incremental update method, taking into account the duplication time necessary for the MFP 20 to duplicate the current firmware. Such an arrangement more effectively reduces the time required for the series of operations in which the MFP 20 receives the data necessary for updating the firmware and updates the firmware, compared with the case where the duplication time is not taken into account.

Although the management server 30 is configured to generate the patch in the firmware update system 10 according to the embodiment, the firmware update apparatus 40 may generate the patch and transmit the patch to the management server 30.

Although the firmware update system 10 according to the embodiment generates the patch in advance of a request from the MFP 20, the firmware update system 10 may generate the patch requested by the MFP 20 upon receipt of the request from the MFP 20.

Although the firmware update system 10 according to the embodiment generates the patches based on all possible combinations of the versions, the firmware update system 10 may generate, in the case where the firmware stored in the firmware memory region of the MFP 20 is constantly maintained to the latest version, only such a patch composed of difference data between the renewed firmware and the firmware of the version immediately preceding the version of the renewed firmware.

Although the firmware update system 10 according to the embodiment includes the management server 30 and the firmware update apparatus 40 as independent units, the function of the management server 30 may be incorporated in the firmware update apparatus 40.

Further, although the firmware update system 10 according to the embodiment determines which of the normal update method and the incremental update method requires the shorter time through comparison between the total time of the communication time 51, the communication time 61, and the generation time 62, and the total time of the communication time 51, the communication time 61, the generation time 62, and the duplication time 63, the firmware update system 10 may additionally take into account the updating time, and a time that may be involved in the updating of the firmware.

Further, although the electronic apparatus in the disclosure is exemplified by the MFP 20 in the embodiment, the electronic apparatus may be an image forming apparatus other than the MFP, such as a dedicated printer, a dedicated copier, and a dedicated facsimile machine, or an apparatus other than the image forming apparatus.

Still further, the firmware update program according to the foregoing embodiment may be recorded on a computer-readable non-transitory recording medium, for example a hard disk, a CD-ROM, a DVD-ROM, and a semiconductor memory. In this case, the computer-readable non-transitory recording medium having the firmware update program recorded thereon constitutes an embodiment of the disclosure.

Various modifications and alterations of this disclosure will be apparent to those skilled in the art without departing from the scope and spirit of this disclosure, and it should be understood that this disclosure is not limited to the illustrative embodiments set forth herein.

What is claimed is:

1. A non-transitory computer-readable recording medium having a software update program recorded thereon, the software update program being configured to cause a computer to act as:
    an update instruction unit that instructs an electronic apparatus to update software; and
    a method selection unit that selects a method that requires a shorter time, from a normal update method in which the electronic apparatus receives renewed software and updates current software to the renewed software, and an incremental update method in which the electronic apparatus (i) receives difference data representing a difference of the renewed software with respect to the current software, and (ii) applies the difference data to the current software thus to update the current software to the renewed software,
    wherein the update instruction unit instructs the electronic apparatus to update the software by the normal update method when the method selection unit selects the normal update method, and instructs the electronic apparatus to update the software by the incremental update method when the method selection unit selects the incremental update method, and wherein the method selection unit (i) acquires data indicating whether the electronic apparatus duplicates the current software and receives the difference data in parallel, (ii) determines that a total time of a difference data reception time necessary for the electronic apparatus to receive the difference data and a generation time necessary for the electronic apparatus to apply the difference data to the current software thus to generate the renewed software constitutes a time required by the incremental update method, and selects either of the normal update method or the incremental update method, in the case where the electronic apparatus duplicates the current software and receives the difference data in parallel, and (iii) determines that a total time of the difference data reception time necessary for the electronic apparatus to receive the difference data, a duplication time necessary for the electronic apparatus to duplicate the current software, and the generation time necessary for the electronic apparatus to apply the difference data to the current software thus to generate the renewed software constitutes the time required by the incremental update method, and selects either of the normal update method or the incremental update method, in the case where the electronic apparatus does not duplicate the current software and does not receive the difference data in parallel.

2. The non-transitory computer-readable recording medium according to claim 1,
wherein a time required by the normal update method includes a renewed software reception time necessary for the electronic apparatus to receive the renewed software,
wherein the time required by the incremental update method includes a total time of a difference data reception time necessary for the electronic apparatus to receive the difference data and a generation time necessary for the electronic apparatus to apply the difference data to the current software thus to generate the renewed software, and
wherein the method selection unit compares the renewed software reception time with the total time, and determines that the normal update method requires a shorter time in the case where the renewed software reception time is shorter, and that the incremental update method requires a shorter time in the case where the total time is shorter.

3. The non-transitory computer-readable recording medium according to claim 2,
wherein the software update program is configured to further cause the computer to act as:
a communication rate acquisition unit that acquires a communication rate of the electronic apparatus;
a renewed software reception time calculation unit that calculates the renewed software reception time based on the communication rate of the electronic apparatus acquired by the communication rate acquisition unit and a size of the renewed software; and
a difference data reception time calculation unit that calculates the difference data reception time based on the communication rate of the electronic apparatus acquired by the communication rate acquisition unit and a size of the difference data.

4. The non-transitory computer-readable recording medium according to claim 3,
wherein the communication rate acquisition unit causes the electronic apparatus to receive data of a specific size in advance, and calculates the communication rate of the electronic apparatus acquired by the communication rate acquisition unit based on a time spent for receiving the data of a specific size.

5. The non-transitory computer-readable recording medium according to claim 2,
wherein the software update program is configured to further cause the computer to act as:
a processing capacity acquisition unit that acquires processing capacity of the electronic apparatus; and
a generation time calculation unit that calculates the generation time based on the processing capacity of the electronic apparatus acquired by the processing capacity acquisition unit and a size of the difference data.

6. The non-transitory computer-readable recording medium according to claim 1,
wherein a time required by the normal update method includes a renewed software reception time necessary for the electronic apparatus to receive the renewed software,
wherein the time required by the incremental update method includes a total time of a difference data reception time necessary for the electronic apparatus to receive the difference data, a duplication time necessary for the electronic apparatus to duplicate the current software, and a generation time necessary for the electronic apparatus to apply the difference data to the current software thus to generate the renewed software, and
wherein the method selection unit compares the renewed software reception time with the total time, and determines that the normal update method requires a shorter time in the case where the renewed software reception time is shorter, and that the incremental update method requires a shorter time in the case where the total time is shorter.

7. The non-transitory computer-readable recording medium according to claim 6,
wherein the software update program is configured to further cause the computer to act as:
a processing capacity acquisition unit that acquires processing capacity of the electronic apparatus; and
a duplication time calculation unit that calculates the duplication time based on the processing capacity of the electronic apparatus acquired by the processing capacity acquisition unit and a size of the current software.

8. A software update apparatus comprising a processor that performs as:
an update instruction unit that instructs an electronic apparatus to update software; and
a method selection unit that selects a method that requires a shorter time, from a normal update method in which the electronic apparatus receives renewed software and updates current software to the renewed software, and an incremental update method in which the electronic apparatus (i) receives difference data representing a difference of the renewed software with respect to the current software, and (ii) applies the difference data to the current software thus to update the current software to the renewed software,
wherein the update instruction unit instructs the electronic apparatus to update the software by the normal update method when the method selection unit selects the normal update method, and instructs the electronic apparatus to update the software by the incremental update method when the method selection unit selects the incremental update method, and
wherein the method selection unit (i) acquires data indicating whether the electronic apparatus duplicates the current software and receives the difference data in parallel, (ii) determines that a total time of a difference data reception time necessary for the electronic apparatus to receive the difference data and a generation time necessary for the electronic apparatus to apply the difference data to the current software thus to generate the renewed software constitutes a time required by the incremental update method, and selects either of the normal update method or the incremental update method, in the case where the electronic apparatus duplicates the current software and receives the difference data in parallel, and (iii) determines that a total time of the difference data reception time necessary for the electronic apparatus to receive the difference data, a duplication time necessary for the electronic apparatus to duplicate the current software, and the generation time necessary for the electronic apparatus to apply the difference data to the current software thus to generate the renewed software constitutes the time required by the incremental update method, and selects either of the normal update method or the incremental update method, in the case where the electronic apparatus does not duplicate the current software and does not receive the difference data in parallel.

* * * * *